United States Patent
Kipp et al.

(10) Patent No.: US 7,017,807 B2
(45) Date of Patent: Mar. 28, 2006

(54) APPARATUS AND METHOD FOR DETECTING TAMPERING WITH CONTAINERS AND PREVENTING COUNTERFEITING THEREOF

(75) Inventors: Timo W. Kipp, 29, Ovington Square, London (GB) SW3 1LG; Frances M. Claessens, Barhkam (GB); John P. Palmer, Palm Beach Gardens, FL (US)

(73) Assignees: Francis M. Claessens, (GB); Timo W. Kipp, (GB)

( * ) Notice: Subject to any disclaimer, the term of this patent is extended or adjusted under 35 U.S.C. 154(b) by 187 days.

(21) Appl. No.: 10/657,283

(22) Filed: Sep. 8, 2003

(65) Prior Publication Data

US 2005/0051624 A1   Mar. 10, 2005

(51) Int. Cl.
*G06F 17/60* (2006.01)
(52) U.S. Cl. .................................. 235/385; 340/568.1
(58) Field of Classification Search ................ 235/385, 235/487, 494; 340/10.1, 571, 572.1, 568.1
See application file for complete search history.

(56) References Cited

U.S. PATENT DOCUMENTS

| | | |
|---|---|---|
| 4,686,516 A | 8/1987 | Humphrey |
| 4,711,368 A | 12/1987 | Simons |
| 4,813,564 A | 3/1989 | Cooper et al. |
| 4,825,801 A | 5/1989 | Weber |
| 5,566,441 A | 10/1996 | Marsh et al. |
| 5,602,530 A | 2/1997 | Holmgren |
| 5,786,626 A | 7/1998 | Brady et al. |
| 5,850,186 A | 12/1998 | Min |
| 5,880,675 A | 3/1999 | Trautner |
| 5,887,176 A | 3/1999 | Griffith et al. |
| 5,953,682 A | 9/1999 | McCarrick et al. |
| 6,031,457 A | 2/2000 | Bonkowski et al. |
| 6,050,622 A | 4/2000 | Gustafson |
| 6,069,955 A | 5/2000 | Coppersmith et al. |
| 6,137,413 A | 10/2000 | Ryan, Jr. |
| 6,162,550 A | 12/2000 | Pinchen et al. |
| 6,226,619 B1 | 5/2001 | Halperin et al. |
| 6,255,948 B1 | 7/2001 | Wolpert et al. |
| 6,271,753 B1 | 8/2001 | Shukla |
| 6,483,473 B1 | 11/2002 | King et al. |
| 6,501,435 B1 | 12/2002 | King et al. |
| 6,549,131 B1 | 4/2003 | Cote et al. |
| 6,556,139 B1 | 4/2003 | Manov et al. |

(Continued)

FOREIGN PATENT DOCUMENTS

EP    0 619 243 B1    10/1994

(Continued)

*Primary Examiner*—Diane I. Lee
(74) *Attorney, Agent, or Firm*—Amster, Rothstein & Ebenstein LLP

(57) ABSTRACT

An apparatus for detecting tampering with a container sealed with a cap. The apparatus includes a radio frequency transceiver for transmitting a signal upon receipt of a transmit command and an antenna attached thereto. In a first embodiment, the radio frequency transceiver and the antenna are mounted on a substrate attached to the container and the cap. The radio frequency transceiver is disabled when the antenna is separated into two portions upon breaking the seal between the container and the cap. In a second embodiment, the apparatus is mounted within a cap and includes a logic circuit and a probe that detects changes in the level of contents within the container. The probe produces an output relative to the level of contents in the container. The logic circuit then either prevents the radio frequency transceiver form communicating or causes it to transmit an alternative signal.

4 Claims, 6 Drawing Sheets

U.S. PATENT DOCUMENTS

| | | |
|---|---|---|
| 6,641,052 B1 | 11/2003 | Baillod et al. |
| 2001/0035815 A1 | 11/2001 | Fletcher et al. |
| 2002/0031997 A1 | 3/2002 | Lawler, Jr. et al. |
| 2002/0057201 A1 | 5/2002 | Manov et al. |
| 2002/0067264 A1* | 6/2002 | Soehnlen ................. 340/572.1 |
| 2002/0067267 A1 | 6/2002 | Kirkham |
| 2002/0175818 A1 | 11/2002 | King et al. |
| 2003/0047530 A1 | 3/2003 | Durbin |

FOREIGN PATENT DOCUMENTS

| | | |
|---|---|---|
| EP | 1 083 519 A2 | 3/2001 |
| FR | 2 703 659 A1 | 10/1994 |
| JP | 2002181296 A | 6/2002 |
| JP | 2002185358 A | 6/2002 |
| WO | WO 00/02661 | 1/2000 |
| WO | WO 00/54724 | 9/2000 |
| WO | WO/ 01/51369 A1 | 7/2001 |
| WO | WO 02/13135 A2 | 2/2002 |
| WO | WO 02/095671 A1 | 11/2002 |
| WO | WO 03/023705 A1 | 3/2003 |
| WO | WO 03/023706 | 3/2003 |

* cited by examiner

APPARATUS AND METHOD FOR DETECTING TAMPERING WITH CONTAINERS AND PREVENTING COUNTERFEITING THEREOF

FIELD OF THE INVENTION

The invention relates generally to an apparatus and method that detects tampering with containers that are sealed with caps, such as bottles, and prevents counterfeiting thereof. More specifically, in a first embodiment, an RFID tag attached to a bottle is disabled upon tampering with the bottle. In a second embodiment, a sensor is integrated with a radio frequency identification ("RFID") tag such that the output of the RFID tag provides an indication of whether the bottle has been tampered with, as determined by the sensor.

BACKGROUND OF THE INVENTION

The wine and spirits industry loses significant revenue due to illicit activities in the supply chain. One of the problems is a proliferation of counterfeit goods. Another problem is goods that have been tampered with, where a tamperer will drain them of their original contents and replace them with a cheap and inferior substitute. The concern with such illicit activities goes even beyond the loss of the sale itself because the proliferation of a poor quality counterfeit product may hurt the reputation of an otherwise well respected label. Furthermore, there are concerns that a counterfeit product or one that has been tampered with may be contaminated with substances that could cause serious health problems. The industry has tried to tackle this illicit activity by implementing countermeasures such as holograms to help identify a genuine product. However these efforts have been largely unsuccessful because counterfeiters have the capability of reproducing them. Therefore, there is a need for a secure system that will allow anyone in the supply chain, from the manufacturer to the customer, to easily detect whether a container has been tampered with or is counterfeit.

It is therefore an object of the present invention to provide an improved apparatus and method for detecting tampering with containers which can not be easily duplicated by counterfeiters.

It is a further object of the present invention to provide an improved apparatus and method for detecting tampering with containers with allows anyone in the supply chain to detect whether a container has been tampered with or is counterfeit.

SUMMARY OF THE INVENTION

The present invention is an apparatus and method for detecting tampering with a container sealed with a cap. Tampering is detected by disabling an RFID tag mounted on the container. Alternatively, the RFID tag transmits a first message when no tampering has been detected, and a second message after detecting tampering. Counterfeit items can also be detected, since only those containers including the apparatus of the present invention are deemed original.

Preferably, the apparatus includes a radio frequency transceiver circuit which will transmit a signal in response to receipt of a command, an antenna having a fixed length and connected to the radio frequency transceiver circuit, and means for preventing the radio frequency transceiver circuit from transmitting a command when the container has been tampered with.

In a first embodiment, the apparatus includes a substrate having a first portion, a second portion, and, preferably, a perforation in the substrate at some point in between the first portion and the second portion. The first portion of the substrate is permanently affixed to a portion of the container in a location proximal to the cap. The second portion of the substrate is permanently affixed to the cap. A radio frequency transceiver circuit is adapted to transmit an identification code upon receipt of a command to transmit and is mounted on the substrate. An antenna having a fixed length is connected to the radio frequency transceiver circuit and is mounted on the substrate. A portion of the antenna is preferably mounted on the substrate over the perforation. The removal of the cap from the container causes the antenna to separate, preventing the radio frequency transceiver from receiving any commands. Preferably, the perforation on the substrate is separated upon removal of the cap from the container, causing the antenna to separate. Preferably, the first embodiment may further comprise a security seal mounted over the substrate, the radio frequency transceiver circuit and the antenna.

In a second embodiment, the apparatus includes a cap adapted to seal the container when connected thereto. A radio frequency transceiver circuit is adapted to transmit an identification code upon receipt of a command to transmit and is mounted within the cap. An antenna having a fixed length is connected to the radio frequency transceiver circuit and is mounted to the cap. A sensor that produces an output indicative of an amount of the substance within the container is mounted within the cap. A means for disabling the radio frequency transceiver when the sensor indicates a change in the amount of the substance within the container is also mounted within the container. Preferably, the sensor of the second embodiment comprises one resistor having a predetermined resistance and a probe connected as a voltage divider that is excited by a battery having a fixed voltage. The probe is formed from a first conductive rod and a second conductive second rod mounted substantially parallel to each other and perpendicular to a horizontal axis of the cap such that the probe has a low resistance when the first conductive rod and the second conductive rod are within the substance in the container and a high resistance when not immersed in the substance in the container. Alternatively, in the second embodiment, a means for modifying the identification code in response to a command to transmit may be substituted for the means for disabling, such that an alternative message is sent after tampering is detected.

Preferably, the present invention is used within containers used in the wine and spirits industry, but, as one of skill in the art will readily recognize, the present invention has a broad application and can be used on any filled container.

BRIEF DESCRIPTION OF THE DRAWINGS

These and other objects and advantages of the invention, as well as the details of the illustrative embodiments, will be more fully understood by reference to the following portion of the specification, taken in conjunction with the accompanying drawings, in which.

DETAILED DESCRIPTION OF THE PREFERRED EMBODIMENTS

Figure 1:
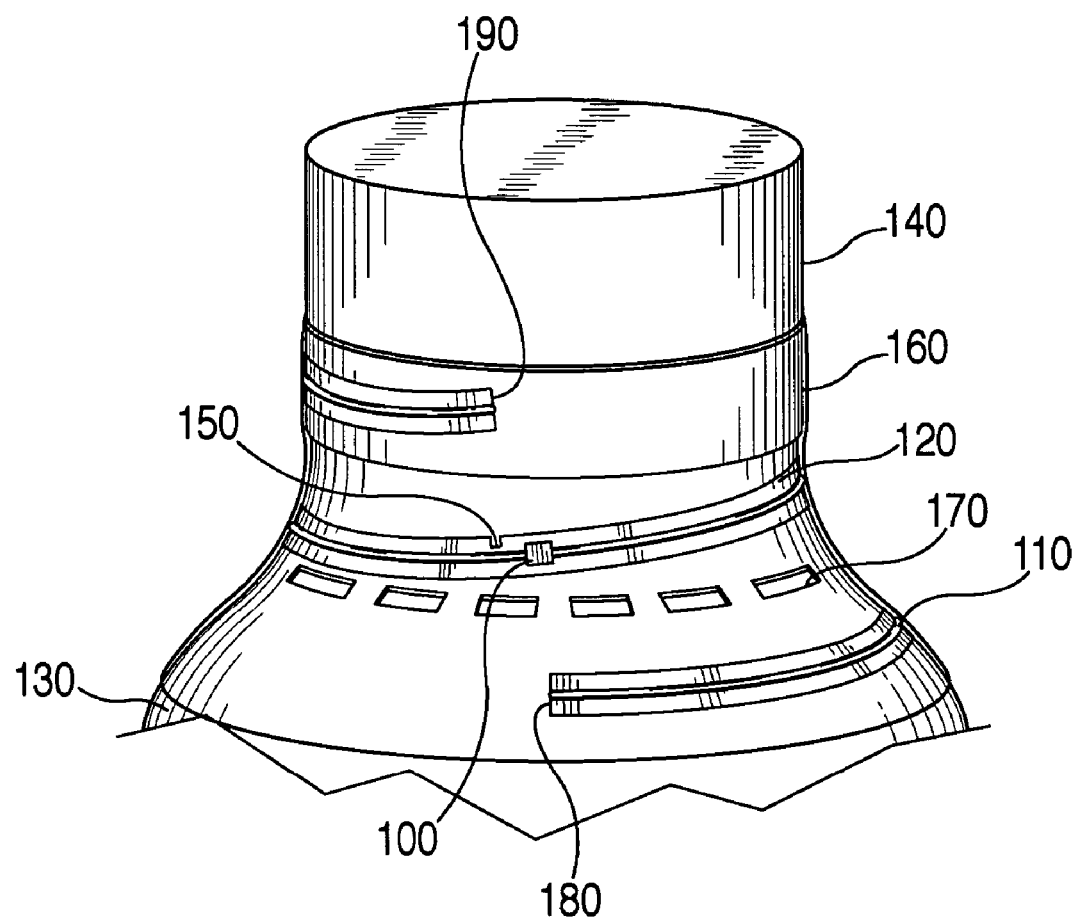
FIG. 1 is a side view of a first embodiment of an apparatus according to the present invention integrated into a plastic security seal around a container and a cap.

The present invention relates to an apparatus for detecting counterfeit or altered containers. FIG. 1 shows a side view of a first embodiment of the apparatus according to the present invention. In this embodiment, a radio frequency identification ("RFID") chip 100 is connected to an antenna 110 having predetermined transmission characteristics controlled by the length thereof so that the RFID chip 100 may respond to radio frequency signals sent from another device known as an interrogator. Preferably, the RFID chip 100 is the so-called "mu-chip" manufactured and sold by Hitachi, but could also constitute any similar product sold by other manufacturers, including but not limited to products from Nippon Electric in Japan and Intermec in the U.S. The RFID chip 100 is a radio frequency back-scatter transceiver that transmits a stored identification code upon receipt of a command to transmit. Preferably, RFID chip 100 is passive, i.e. it uses the received signal to power itself. As one of skill in the art will readily recognize, a non-passive chip could be used for RFID chip 100 so long as a power source, e.g., a battery, is also included.

The RFID chip 100 and the antenna 110 are mounted on a substrate 120, preferably formed of polyimide. The substrate 120 includes a perforation 150 close to where RFID chip 100 is mounted and is permanently affixed to a container 130 on a first end 180 and to a cap 140 that has sealed the container 130 on a second end 190. The substrate 120 is affixed in such a manner that the antenna 110 is wrapped around the circumference of the container 130 and the cap 20. When the cap 140 is twisted to remove it from the container 130 the polyimide substrate 120 ruptures at perforation 150. This causes a section of the antenna 110 to be separated and thus prevents the RFID chip 100 from transmitting or receiving signals from the interrogator, due to the change in the characteristics of antenna 110. In order to protect the RFID chip 100, the antenna 110 and the substrate 120 are preferably covered with a security seal 160 which has a multiplicity of perforations 170 along which it separates when the bottle cap 140 is removed from the bottle.

To verify the authenticity of the container 130, an interrogator is used to transmit an interrogation signal appropriate for the particular chip chosen for the RFID chip 100 (when the antenna 110 is connected and not separated). The interrogation signal may simply tell the RFID chip 100 to activate itself and send a response signal. Alternatively, the interrogation signal may be a more complex code or instruction that would require the RFID chip 100 to send a particular message in the response signal. Additionally, the response signal may contain information about the contents in the container such as the amount and type. The interrogator, however, will not receive a response signal if the container 130 has been opened, indicating it has been tampered with, or if the container 130 does not contain the apparatus at all, indicating that it is counterfeit, since RFID chip 100 will not receive the transmitted signal due to the change in characteristics of antenna 110. Therefore, in this first embodiment, a tampered bottle will be identified by its failure to respond to an interrogation.

Figure 2:
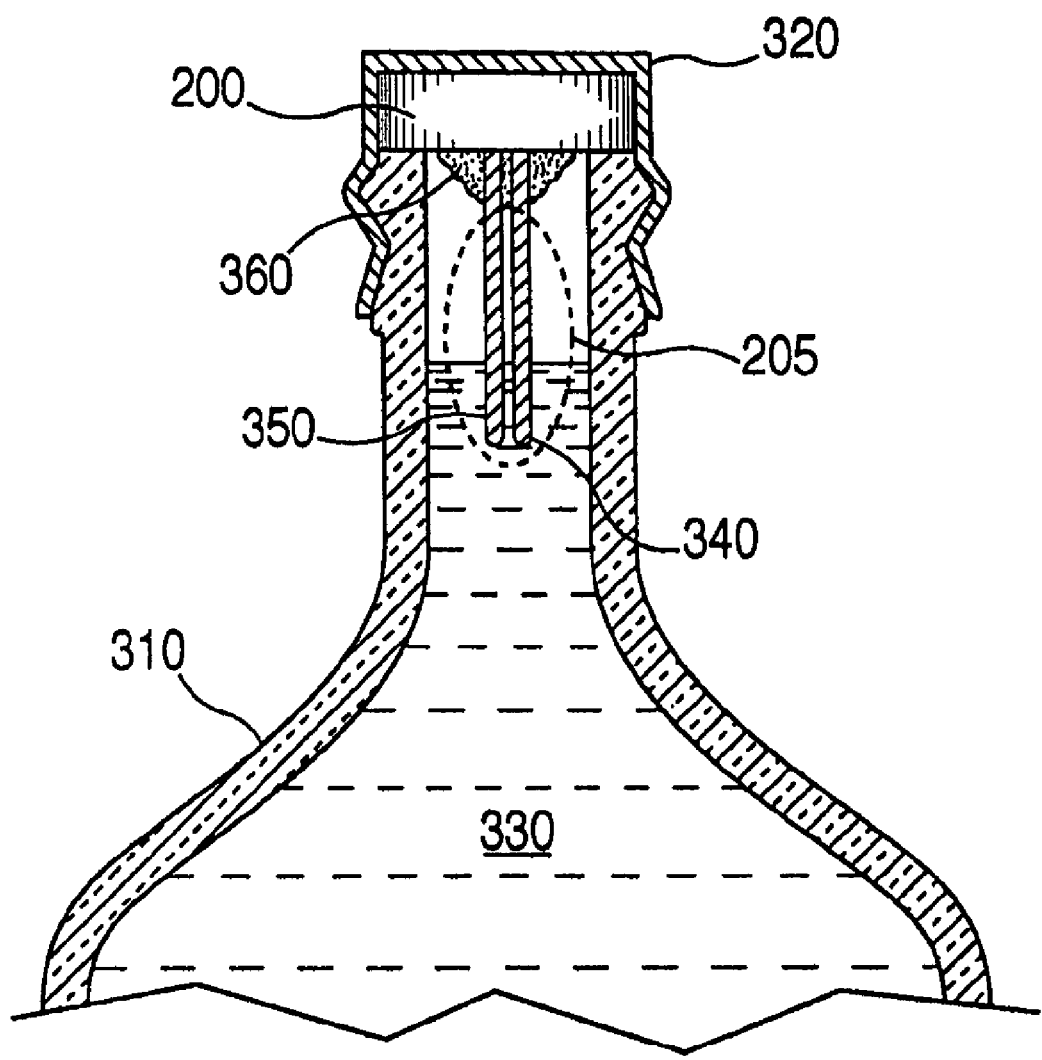
FIG. 2 is a side view of the apparatus integrated into the cap and attached to a container according to the second embodiment.
Figure 3:
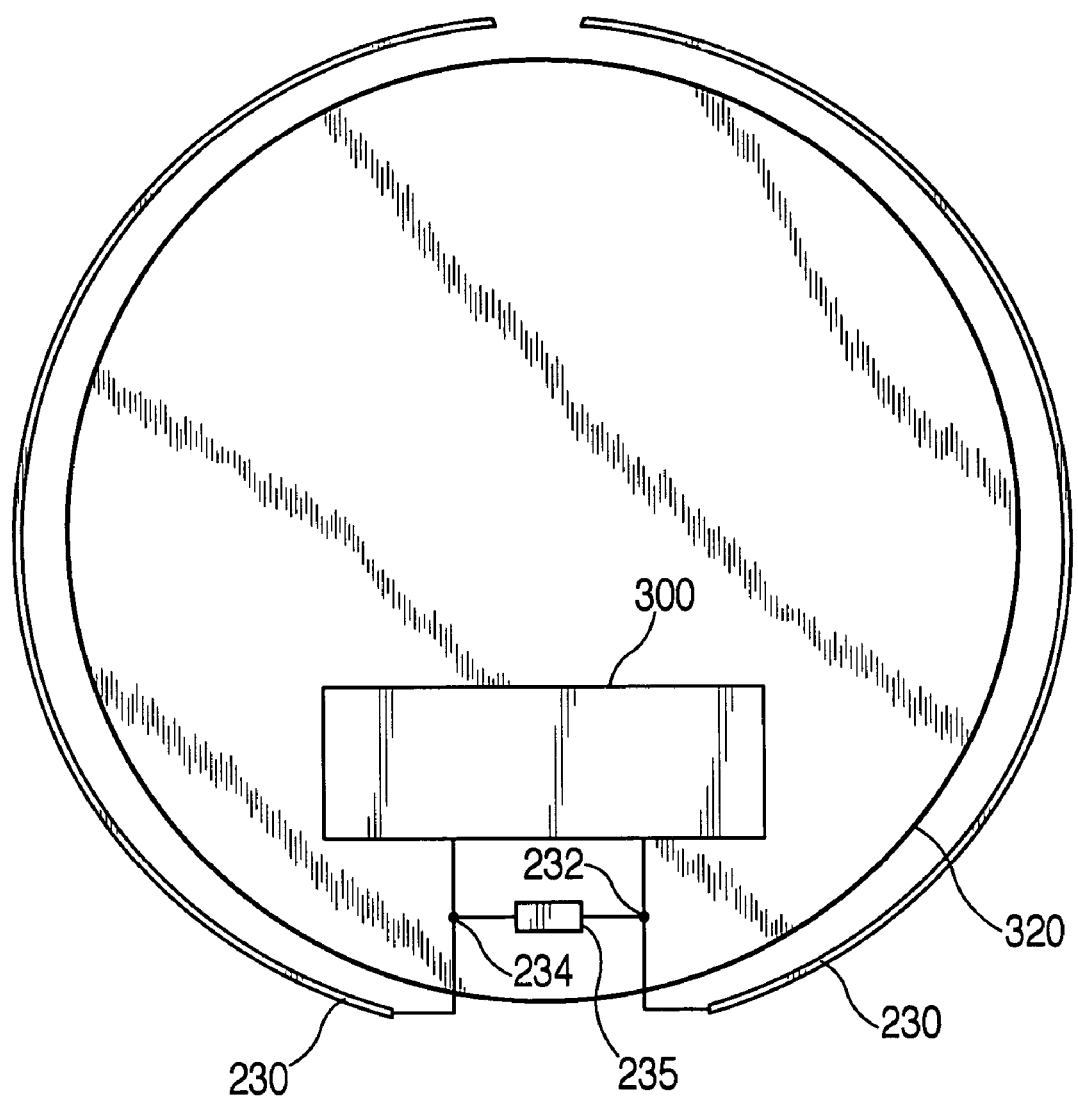
FIG. 3 is a top view of the electronic assembly in the second embodiment of the apparatus integrated into the cap according to the present invention.
Figure 4:
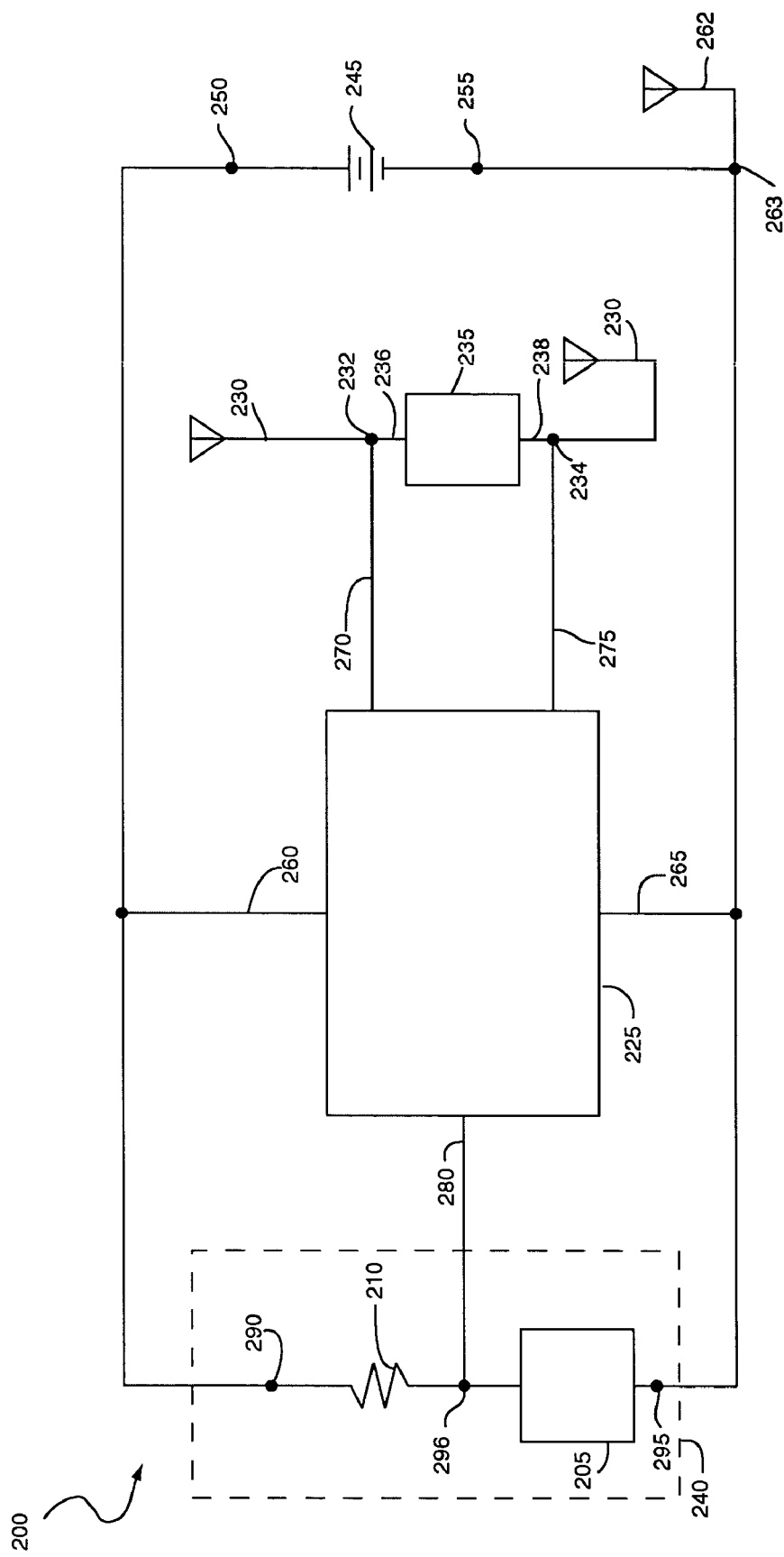
FIG. 4 is a block diagram of an electronic assembly in a second embodiment of the apparatus according to the present invention.
Figure 5:
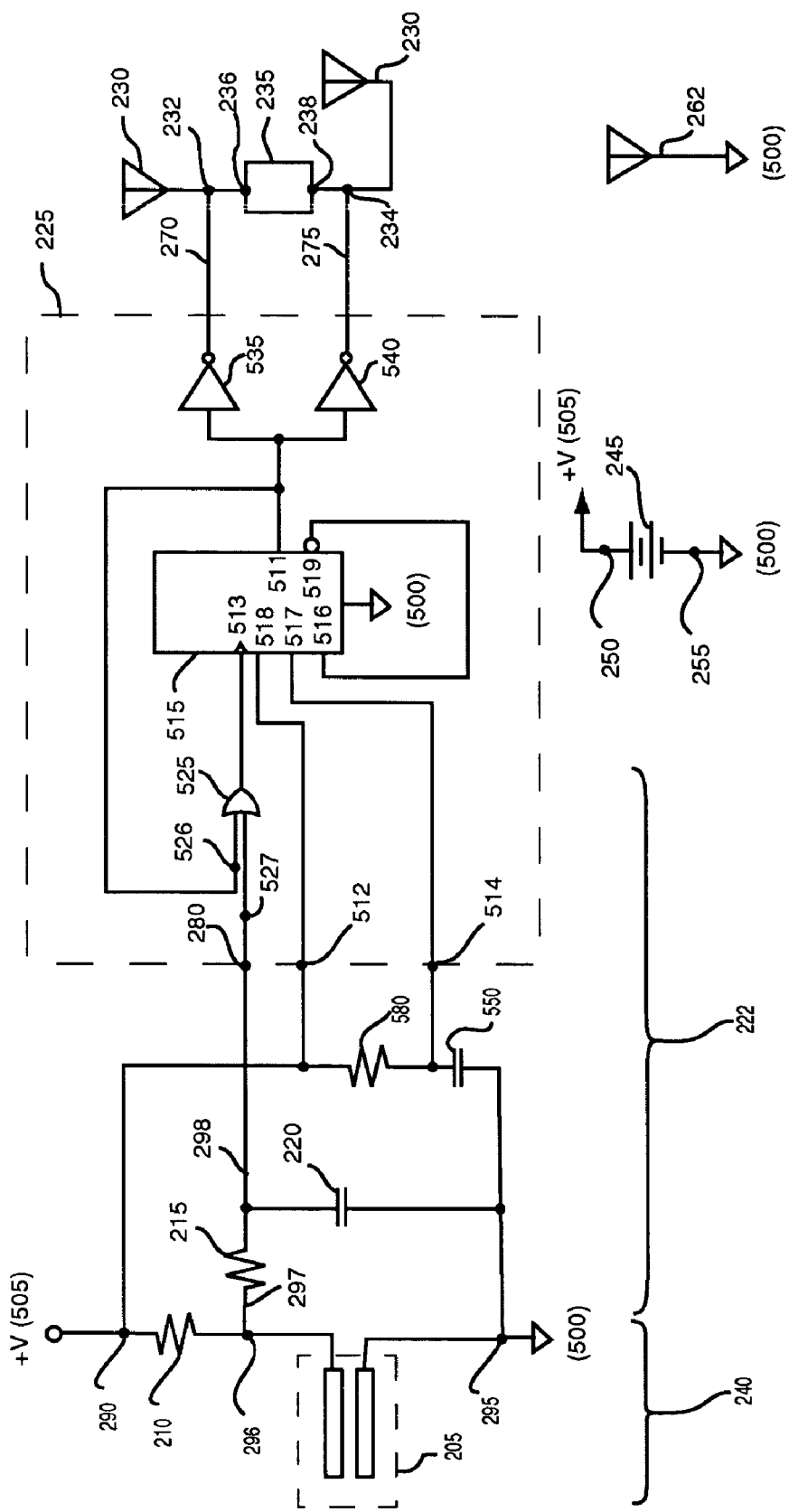
FIG. 5 is a schematic drawing of the electronic circuit of the apparatus according to the second embodiment.

FIGS. 2 and 3 depict the second embodiment of the present invention, and, in particular, show how electronic assembly 200 of FIGS. 4 and 5 is integrated into a cap 320 that seals a container 310.

FIG. 2 is a side view of shows the electronic assembly 200 of FIGS. 4 and 5 integrated into a cap 320 and attached to a container 310. Probe 205 is formed from two rods 340 and 350, which are preferably substantially parallel to each other and conductive—preferably made of stainless steel. Rods 340 and 350 protrude from a point that is substantially in the center of the cap 320. An adhesive 360 is preferably placed around the probe 205, in order to form a liquid tight seal ensuring that the other portions of the electronic assembly 200 are protected from contamination. The cap 320 seals the container 310 filled with contents 330, and, when sealed, the bottom portions of the rods 340 and 350 extend into the contents 330. The two rods 340 and 350 are sized to a length so that their end portions remain in contact with the contents 330 regardless of the angle at which the container 310 is oriented.

In FIG. 3, block 300 represents battery 245, logic chip 225, Q-spoiler antenna 262 and voltage divider 240 of FIG. 4. The components within block 300 and RFID chip 235 are encased within the cap 320 and the two portions of antenna 230 go around the circumference of the cap 320. As one of skill in the art will readily recognize, depending upon the size of the cap 320, the two antenna portions 230 may run along the inner circumference or the outer circumference of the cap 320, or may even be embedded within the walls of the cap 320.

FIG. 4 is a block diagram of the electronic assembly 200. The electronic assembly 200 is comprised of a probe 205, resistor 210, a logic chip 225, an RFID chip 235, a two-part antenna 230, a Q-spoiler antenna and a battery 245.

Resistor 210 combines with probe 205 to form a voltage divider 240. Preferably, resistor 210 has a resistance of 10 Mohm, but as one of skill in the art will readily recognize, this value depends on the resistance of probe 205. As shown in FIG. 2, voltage divider 240 includes three nodes, node 290, 295 and 296. As one of skill will readily recognize, when a fixed voltage is applied between nodes 290 and 295, a signal will be obtained between nodes 296 and 295 that will vary as the resistance of probe 205 changes.

Q-spoiler antenna 262 is an electrically conductive body of arbitrary size, shape and spatial orientation such that when it is electrically connected to antenna 230, by logic chip 225, the resonant property of antenna 230 is effectively diminished. In many cases, the Q-spoiler antenna 262 may be the negative electrode of battery 245.

Battery 245 has a positive terminal 250 and a negative terminal 255 and is used to excite the voltage divider 240 and to power logic chip 225, and is preferably of the lithium coin package style. Positive terminal 250 of battery 245 is connected to positive power connection 260 of the logic chip 225 and to node 290 of the voltage divider 240. The negative terminal 255 of battery 245 is connected to the negative power connection 265 (ground) to node 295 of the voltage divider 240, and to node 263 of the Q-spoiler antenna 262.

The logic chip 225, which is discussed in more detail with respect to FIG. 5, includes a positive input terminal 280 that is connected to a node 296 of the voltage divider 240. The logic chip 225 also has a first output terminal 270 and a second output terminal 275 that are connected to the antenna 230 at nodes 232 and 234, respectively. The RFID chip 235 also has a first output terminal 236 and a second output terminal 238 that are connected to the antenna 230 at node 232 and node 234, respectively. The voltage divider 240 provides a signal between nodes 296 and 295 that varies with the resistance of probe 205. The logic chip 225 monitors the signal provided by voltage divider 240, and, in turn, can generate an output signal on output terminals 270, 275 that prevents the RFID chip 235 from responding to an interrogation signal, depending on the input signal to logic chip 225 provided by voltage divider 240. Thus, for example, when probe 205 is immersed within the contents of a container, the resistance of probe 205 will be much lower than the resistance of resistor 210, and the voltage signal provided by voltage divider between nodes 296 and 295 will be low. Logic chip 225 allows RFID chip 235 to operate normally when the signal input at terminals 280, 265 is low (for the first instance of insertion of probe 205 into the contents of a container). However, if the contents of the container are emptied (or if the probe 205 is removed from the contents of the container), the resistance of probe 205 will greatly increase, generating a high voltage between nodes 296 and 295 (and thus at input terminals 280, 265), and causing logic chip 225 to disable RFID chip 235. If probe 205 is reinserted into the contents of the container, after having been removed from the container, logic chip 225 continues to disable RFID chip 235.

As discussed above, the voltage signal output between nodes 296 and 295 by the voltage divider 240 of FIG. 4 is a function of the resistance of probe 205, and thus is a function of the resistance between the rods 340 and 350. When the probe 205 is immersed in the contents 330 of the container 310, as shown in FIG. 4, the resistance between the rods 340 and 350 is of the order of 100 kohms and the voltage difference between nodes 296 and 295 of the voltage divider 240 will be low. However, when the probe 205 is removed from the contents 330, the resistance between the rods 340 and 350 is on the order of 100 Mohms, and the voltage difference between nodes 296 and 295 of the voltage divider 240 will be high. The voltage difference between nodes 296 and 295 of the voltage divider 240, therefore, provides an output signal that indicates whether the probe 205 is immersed in the contents 330.

As one of skill in the art will readily recognize, any mechanism that can detect the presence of a fluid (or other contents) in a container may be used instead of the voltage divider 240. For example, the level sensor may be a system that detects changes in the resonant frequency in the air space between the cap 320 and the contents 330. Other alternative level sensors include one that detects changes in the distance of a float that rests on top of the contents 330, or one that senses a change in air pressure within the container.

FIG. 5 is a schematic drawing that illustrates in detail the components comprising logic chip 225 of FIG. 4. In FIG. 5, all components common to FIG. 4 share the same reference number and operate in an identical manner. For convenience, battery 245 is shown with positive terminal 250 connected to +V (node 505) and the negative terminal 255 connected to common (node 500), and the power connections for logic chip 225 are not shown. In FIG. 5, Q-spoiler antenna 262 is shown connected to common (node 500).

The output of the voltage divider 240, i.e., the voltage between nodes 296 and 295, is provided to input terminal 297 of a series connection of resistor 215 and capacitor 220. The output terminal 298 of the series connection of resistor 215 and capacitor 220 is provided to input 527 of OR-gate 525, through input 280 of logic chip 225. The input port 527 of OR-gate 525 is a Schmitt trigger input, such as is constructed in the 74HC7002 specification of a 2-input OR gate. The combined effects of the series connection of resistor 215 and capacitor 220, together with the Schmitt trigger input of OR-gate 525 is a de-bounce circuit 222, as is commonly known to those of skill in the art. The output of de-bounce circuit 222 will be a logic high when probe 205 is not immersed in the contents of container 310 of FIG. 4, and will be a logic low when probe 205 is immersed in the contents of container 310. The Schmitt trigger output signal is clean and stable and essentially functions as a way to convert the noisy and naturally varying analog output signal of the voltage divider 240 into a digital signal.

The output signal of the OR-gate 525 is connected to the clock input 513 of D flip-flop 515. Input 513 is a positive-edge triggered clock input terminal of D flip-flop 515. The non-inverting output 511 of D flip-flop 515 is connected to a second input of OR-gate 525 (which may be a Schmitt trigger input, or may be a conventional input). The non-inverting output 511 of D flip-flop 515 also is connected to the single input terminals of first and second inverters 535 and 540 having open-drain outputs. A second output 519 of the D flip-flop 515 produces an inverted signal compared to the first output 511 and is fed back to a data input terminal 516 on the D flip-flop 515.

The output of the first and second inverters 535 and 540 are connected to the antenna 230 through the output terminals 270 and 275 of the logic chip 225. When their inputs are high, the low outputs of the first and second inverters 535 and 540 pull the outputs 236 and 238 of RFID chip 235 down, essentially shorting them to the Q-spoiling antenna 262, and preventing the RFID chip 235 from communicating with an interrogator.

D flip-flop 515 also includes a SET input 518 and a CLEAR input 517, both of which are asserted low. Thus, as shown in FIG. 5, the SET input 518 is tied to the positive terminal 250 of battery 245 (node 505) at input 512 and thus is inactive. In addition, an RC timing network comprising a resistor 580 and a capacitor 550 is connected between +V (node 505) and common (node 500). As one of skill in the art will readily recognize, the signal at node 514 will be low when power is first applied (e.g., when the battery 245 is installed) and will, at a rate determined by the RC time constant, charge up until a high level (i.e., +V) is reached. In the preferred embodiment, resistor 580 is 1 megohm and capacitor 550 is 1 microfarad. Thus, when the battery 245 is first installed, the input to D flip-flop 515 will be low, clearing the D flip-flop 515 of any prior states and setting the output 511 thereof low. Thereafter, the CLEAR input 517 will not change so long as the battery 245 is not removed.

Figure 6:
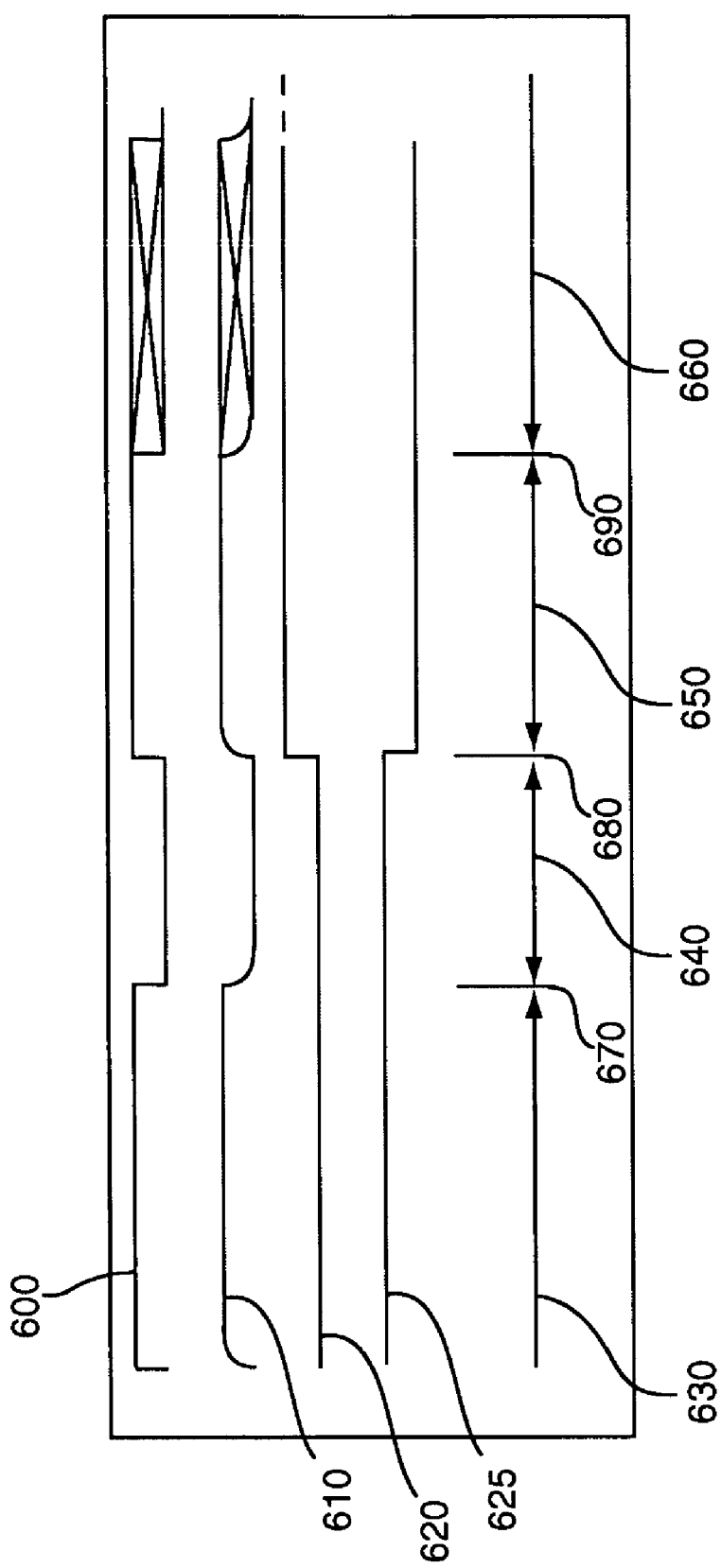
FIG. 6 is a timing diagram of input and output signals of various components in the electronic circuit of FIG. 5 according to the second embodiment.

FIG. 6 is a timing diagram that illustrates the operation of logic chip 225. The first trace 600 represents the voltage across probe 205. The second trace 610 is the voltage at input 280 of logic device 225. The third trace 620 is the signal at the output 511 of the D flip-flop 515. The fourth trace 625 is the signal at output lines 270 and 275 which connect logic chip 225 to antenna 230. The first significant event occurs when battery 245 is installed, which must occur with the probe 205 not positioned in a fluid or other container contents. As such, the output of OR-gate 525 will be high, as discussed above, and the output of D-flip-flop 515 will be low because it has been reset on installation of the battery 245, as discussed above. This is shown in the first portion 630 of the timing diagram of FIG. 6.

At point 670 the second significant event occurs, i.e., the cap 320 is installed on a container 310, so that probe 205 is put in contact with the contents 330 of container 310. During the periods 630 and 640 thereafter, the apparatus is "set"—meaning that the RFID chip 235 will be able to respond to interrogation by an RFID interrogator. In particular, at point 670, the input 527 to OR-gate 525 begins to go low, becoming a low logic level in one millisecond or less, as determined by the values of resistor 215 and capacitor 220. When the input 527 to OR-gate 525 becomes low, the output of OR-gate becomes low. Since this negative-going edge signal is presented to the positive-edge-triggered clock input 513 of D flip-flop 515, there is no signal change at the outputs 511 and 519 of D flip-flop 515. Since the D flip-flop 515 had been cleared during battery insertion, the RFID chip 235 continues to be able to respond to interrogation by an RFID interrogator.

The third significant event 680 is the first removal of cap 320 (and the corresponding removal of probe 205 from the contents 330 of container 310). The logic chip 225 at this point disables the RFID chip 235 from communicating with an interrogator. In particular, upon the removal of probe 205 from the contents 330 of container 310, the input 527 to OR-gate 525 begins to go high, becoming a high logic level in one millisecond or less, as determined by the values of resistor 215 and capacitor 220. When the input 527 to OR-gate 525 becomes high, the output of OR-gate also becomes high. Since this positive-going edge signal is presented to the positive-edge-triggered clock input 513 of D flip-flop 515, the output toggles high, and the outputs 270 and 275 of the two inventors 535 and 540 short the antenna 230 to the Q-spoiler antenna 262. This is shown during period 650 of FIG. 6.

The fourth significant event 690 is any subsequent insertion or withdrawal of cap 320 to or from the contents 330 of container 310. As can be seen from FIG. 6, and in particular during period 660, regardless of the input 527 to OR-gate 525, the output of OR-gate 525 will not change again since input 526 is held high by output 511 of D flip-flop 515, and the output of D flip-flop 515 will not change again because it can only be clocked by a negative-to-positive transition in the output of OR-gate 525, thereby preventing the apparatus from being reset. Thus, once the cap 320 is removed from container 310, the RFID chip 235 is permanently disabled (unless, as one of skill in the art will readily recognize, the battery is removed and reinstalled). As a result, the container 310 will only be verified as authentic and not tampered with when it responds to interrogation—which only occurs if cap 320 is not removed.

When interrogated, the RFID chip 235 may be programmed to respond with information identifying the particular container 310, the contents 330 of the container 310, the amount of contents 330 in the container 22 and/or any other information that may be useful.

In an alternative to the second embodiment, the RFID chip 235 may be combined with the logic chip 225 on a single integrated circuit. As one of skill in the art will readily recognize, in this situation it is possible to program two different codes into the RFID chip 235 that may be transmitted when interrogated. In this situation, the apparatus includes logic that allows a first response to be generated to an interrogation prior to the cap 320 being removed from container 310, as above, and a second response generated after being removed from container 310. Furthermore, one of skill in the art will readily recognize that this added functionality may also be provided by modifying logic chip 225 accordingly.

The present invention offers a great flexibility in offering four independent features, in that the communication capabilities of each device may be controlled electronically (e.g., at the point of sale), mechanically (i.e., the tag is disabled once the cap is removed by separating two antenna portions), based upon liquid level (i.e., once the cap is removed or contents have been siphoned out) and lack of programmability (i.e., each tag has its information fixed upon manufacture).

Although the present invention has been shown and described with respect to preferred embodiments, various changes and modifications can be made which lie within the spirit and scope of the invention. Thus, numerous changes and modifications can be made while staying within the scope of the invention which is set forth in the appended claims. For example, the tag may be electronically disabled.

We claim:

1. An apparatus for detecting tampering with a container filled with a substance, comprising:
    a cap adapted to seal said container when connected thereto;
    a radio frequency transceiver circuit adapted to transmit an identification code upon receipt of a command to transmit and mounted within said cap;
    an antenna having a fixed length connected to said radio frequency transceiver circuit and mounted to said cap;
    a sensor that produces an output indicative of an amount of said substance within said container and mounted within said cap; and
    means for disabling said radio frequency transceiver when said sensor indicates a change in said amount of said substance within said container mounted within said cap.

2. The apparatus of claim 1 wherein said sensor comprises a resistor having a predetermined resistance and a probe connected as a voltage divider and excited by a battery having a fixed voltage, said probe comprising a first conductive rod and a second conductive rod mounted substantially parallel to each other and perpendicular to a horizontal axis of said cap such that said probe has a low resistance when said first and second rods are in said substance of said container and a high resistance when said probe is not immersed in said substance of said container.

3. An apparatus for detecting tampering with a container filled with a substance, comprising:
    a cap adapted to seal said container when connected thereto;
    a radio frequency transceiver circuit adapted to transmit one of a plurality of identification codes upon receipt of a command to transmit and mounted within said cap;
    an antenna having a fixed length connected to said radio frequency transceiver circuit and mounted to said cap;
    a sensor that produces an output indicative of an amount of said substance within said container and mounted within said cap; and
    means for instructing said radio frequency transceiver to transmit a particular one of said plurality of identification codes based upon said output of said sensor.

4. The apparatus of claim 3 wherein said sensor comprises a resistor having a predetermined resistance and a probe connected as a voltage divider and excited by a battery having a fixed voltage, said probe comprising a first conductive rod and a second conductive rod mounted substantially parallel to each other and perpendicular to a horizontal axis of said cap such that said probe has a low resistance when said first and second rods are in said substance of said container and a high resistance when said probe is not immersed in said substance of said container.

* * * * *